United States Patent [19]

Veazey

[11] Patent Number: 4,690,979

[45] Date of Patent: Sep. 1, 1987

[54] TERMINALLY FUNCTIONALIZED POLY(ALLOOCIMENE)

[75] Inventor: Richard L. Veazey, East Windsor, N.J.

[73] Assignee: Union Camp Corporation, Wayne, N.J.

[21] Appl. No.: 927,230

[22] Filed: Nov. 5, 1986

[51] Int. Cl.$^4$ ............................. C08F 8/42; C08F 8/34
[52] U.S. Cl. .................................... 525/153; 525/154; 525/331.9; 525/344; 525/354; 525/371; 525/377; 525/383; 525/385; 525/386; 525/388; 526/290; 526/340.3
[58] Field of Search ................... 525/153, 154, 331.9; 526/290, 340.3

[56] References Cited

U.S. PATENT DOCUMENTS

| | | | |
|---|---|---|---|
| 2,406,575 | 8/1946 | Young et al. | 525/331.9 |
| 3,278,641 | 10/1966 | Bell, Jr. | 526/340.3 |
| 3,373,149 | 3/1968 | Doyle, Jr. | 528/393 |
| 3,715,341 | 2/1973 | Velzmann | 528/374 |
| 3,929,850 | 12/1975 | Streck, et al. | 526/279 |
| 3,939,131 | 2/1976 | Morikawa et al. | 526/308 |
| 4,169,116 | 9/1979 | Trotter et al. | 525/210 |
| 4,229,549 | 10/1980 | Usami et al. | 525/308 |
| 4,282,337 | 8/1981 | Roggero et al. | 525/285 |
| 4,388,359 | 10/1981 | Trotter et al. | 525/232 |
| 4,524,187 | 6/1985 | Grew et al. | 525/342 |

*Primary Examiner*—Joseph L. Schofer
*Assistant Examiner*—Bernard Lipman
*Attorney, Agent, or Firm*—Edward J. Sites

[57] ABSTRACT

Poly(alloocimene) is functionalized by reaction with an electrophile to obtain polymers useful as a film-former in a coating composition.

14 Claims, 1 Drawing Figure

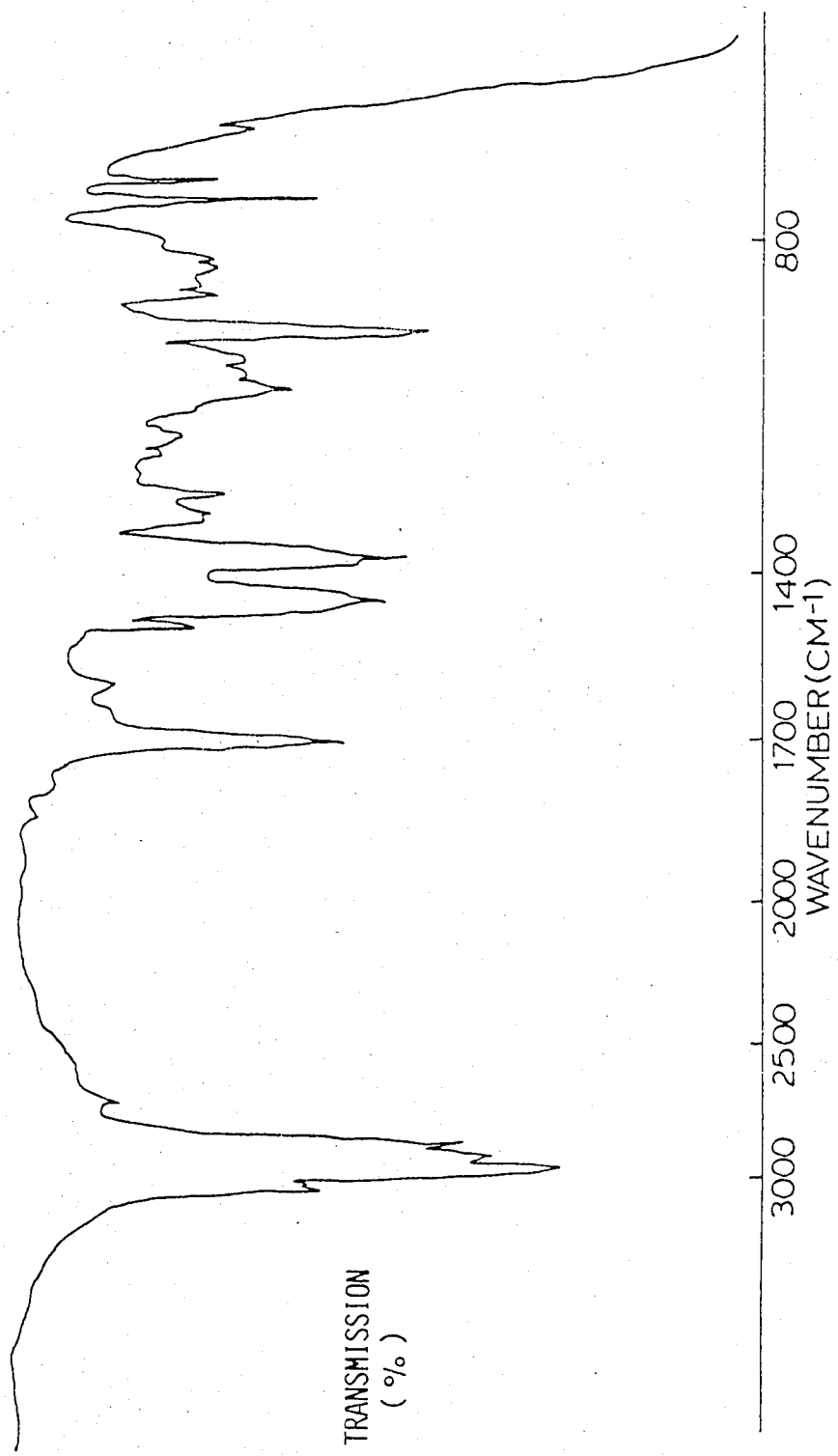

TERMINALLY FUNCTIONALIZED POLY(ALLOOCIMENE)

The invention relates to poly(alloocimene) and more particularly concerns functionalized poly(alloocimene) containing conjugated double bonds in pendant side chains.

SUMMARY OF THE INVENTION

The invention comprises the functionalized polymer, prepared from the reaction of electrophilic reagents such as carbon dioxide, formaldehyde, aldehydes, esters, ketones, nitriles, ethylene oxide, and the like with the active poly(alloocimene) anion.

The term "functionalized polymer" as used herein means reactive, functional chemical groups such as hydroxy or carboxyl groups have been attached to a polymer chain end by reaction of the sodium salt of the polymer with an electrophilic reagent.

The polymers of the invention are useful as film-formers in coatings and as film modifiers in latexes.

BRIEF DESCRIPTION OF THE DRAWING

The drawing is of the infrared spectra of carboxylated poly(allocimene) prepared in accordance with the procedure of Example 2, infra.

DETAILED DESCRIPTION OF THE PREFERRED EMBODIMENTS OF THE INVENTION

The polymers of the invention are functionalized alloocimene polymers, and are prepared from particular poly(alloocimene) polymers having conjugated double bonds in pendant side chains. The polymers comprise polymeric mixtures of chain units of the formulae:

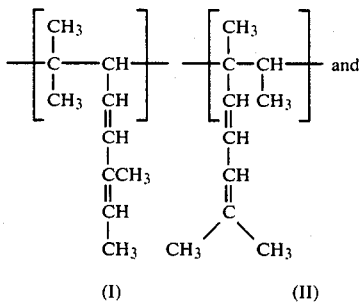

(I)   (II)

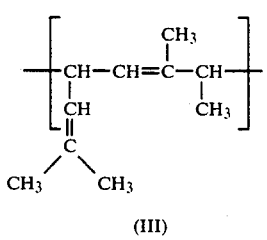

(III)

These poly(alloocimene) polymers comprise mixtures of a majority of chain moieties I and II as a group and a minority of chain moiety III. We define 2,3- and 6,7-poly(alloocimene) as a composition consisting of greater than 50 weight percent of 2,3-poly(allooci-mene), (I), and 6,7-poly(alloocimene), (II), and less than 50 weight percent of 4,7-poly-(alloocimene), (III).

A measure of the amount of conjugated double bonds in poly(alloocimene) is the magnitude of the molar absorptivity in its ultraviolet spectrum. Typically poly(alloocimenes) polymerized with alkali metals as catalysts have polymer unit absorptivities at 247 nm greater than 10,000.

The poly(alloocimene) employed to prepare the polymers of the invention is advantageously the homopolymer of alloocimene having a weight average molecular weight of from about 500 to 100,000.

The 2,3- and 6,7-poly(alloocimene) may be prepared in the following manner: substantially anhydrous alloocimene is added slowly to a catalyst system comprised of an active metal catalyst component dispersed in a substantially anhydrous ether component under an inert gas atmosphere. Controlled reaction by slow alloocimene addition is necessary because the polymerization is highly exothermic. It is preferred that the alloocimene feed be essentially free of peroxides, water, and alcohols. The metal polymerization catalyst components may be any alkali metal or calcium, substantially free of oxides or other contaminants and being present at a concentration of less than about 10 mole percent of the alloocimene. The active metal catalyst may be present as spheres, wire, foil, or finely divided dispersion and may be in the pure state, as a mixture or an alloy, or as a solution with aromatic hydrocarbons, such as naphthalene, 2-methylnaphthalene, and the like.

The ether components used in the polymerization are aliphatic or cycloaliphatic ethers. The ethers are preferred in amounts of greater than about 5 weight percent of the alloocimene. The ether components most preferred are tetrahydrofuran and 1,2-dimethoxylethane. Inert hydrocarbon solvents and diluents may be present, for example, benzene, toluene, xylene, ethylbenzene, pentane, hexane, cyclohexane, heptane, octane, nonane, limonene, para-cymene, and the like, or mixtures thereof.

The polymerizations may be carried out at temperatures of from about $-78°$ C. to about $100°$ C., with reaction times of from about 10 minutes to about 500 hours. Most preferably the polymerizations are carried out at temperatures of from about $-50°$ C. to about $20°$ C., with reaction times of from about 1 to about 8 hours.

Low polymerization and reaction temperatures are advantageous. Temperatures above about $20°$ C. have been found to increase the rate of formation of chain terminating and anionically active by-products. Such by-products preferentially react with the electrophilic reagents, described hereinafter.

When the polymerization is complete, reaction of the electrophilic reagent with the anionically active poly(alloocimene) may be brought about by the addition of the electrophilic reagent to the active poly(allooci-mene) in solution or addition of the poly(alloocimene) solution to the electrophilic reagent dissolved in a suitable solvent.

A wide variety of electrophilic reagents are known and available for carrying out the functionalization of the poly(alloocimene) described above to obtain the polymers of the invention. Representative of such electrophiles are carbon dioxide; organic aldehydes and dialdehydes such as formaldehyde, acetaldehyde, propionaldehyde, n-butyraldehyde, isobutyraldehyde, methylethylacetaldehyde, diethylacetaldehyde, cyclopentylaldehyde, benzaldehyde, phenylacetaldehyde, furfural, 5-methylfurfural, glyoxal, malonaldehyde, adipic dialdehyde and the like; ketones and diketones such as acetone, methyl ethyl ketone, methyl n-butyl ketone, methyl isoamyl ketone, n-propyl n-butyl ketone, cyclobutanone, methyl cyclobutyl ketone, acetophenone, methyl benzyl ketone, phenyl n-butyl ketone, 2-acetylfuran, acetylacetone, propionylacetone, n-valerylacetone and the like; alkylene oxides such as ethylene oxide, propylene oxide and the like; monocarboxylic esters such as ethyl formate, ethyl acetate, n-butyl acetate, n-butyl-n-butyrate and the like; dicarboxylic esters such as ethylene carbonate, tetramethylene carbonate, diethyl oxalate and the like; nitriles and dinitriles such as ethyl cyanide, n-propyl cyanide, n-hexyl cyanide, benzonitrile, tolunitrile, malonitrile, succinonitrile, hexamethylene cyanide and the like; oxygen, sulfur, sulfur dioxide, sulfur trioxide and the like; group IVa metal halides such as silicon tetrachloride, germanium tetrachloride, lead chloride and the like.

The amount of electrophilic reagent addition to the poly(alloocimene) that takes place may be easily measured. For example, if carbon dioxide is added to poly(alloocimene) a carboxylic acid is produced. The amount of carboxylic acid present is measured by titration with base and is recorded as an acid number. In general, the amount of addition of oxygenated electrophilic species can be estimated by determining the percent oxygen in the elemental analysis of the functionalized poly(alloocimene).

A measure of how much unsaturation remains in the poly(alloocimene) is the iodine value. Typically values around 250 are achieved upon the sodium polymerization of alloocimene. If one or more of the double bonds in each poly(alloocimene) polymer unit reacts with the electrophilic species, lower iodine values are achieved. The iodine values reported in the table of the functionalized poly(alloocimenes) of Examples 1 and 2, infra, indicate that none of the double bonds of the carboxylated poly(alloocimene) reacted with carbon dioxide.

When the desired functionalization of the poly(alloocimene) has been achieved, addition of a proton source such as water, acid, alcohol, or mixtures thereof, to the reaction mixture, in molar excess of the alkali metal catalyst terminates the reaction and thereby produces the polymers of the instant invention.

Following the functionalization, the reaction mixture containing the terminally functionalized poly(alloocimene) may be subjected to distillation to remove the ether solvent, unreacted terpenes, any other diluents, and any excess of added termination reagent. Care should be taken not to exceed a temperature of about 150° C. in the distillation pot containing the polymer, otherwise excessive thermal degradation of the polymer may occur. The polymer may be discharged while still molten onto a polytetrafluoroethylene-coated glass fabric or other suitable surface and allowed to cool. The cooled polymer may then be packaged, preferably under a nitrogen atmosphere to protect it from oxidation.

A second polymer isolation procedure, although not requisite, may be employed especially for higher molecular weight poly(alloocimene). This method involves cautious transfer of the terminally functionalized polymer and diluents into a large excess of a nonsolvent, such as methanol, or the like. The product precipitates as a white solid. Collecting, redissolving, and reprecipitating the solid product several times gives, after finally drying, a product free of low molecular weight impurities. The dried, isolated functionalized poly(alloocimene) is then packaged and stored in a nitrogen atmosphere.

It is advantageous to add an antioxidant, such as 2,6-di-tert-butyl-4-methylphenol or the like, prior to distillative isolation, or in the final precipitation solvent to protect the functionalized poly(alloocimene) from oxidizing.

The functionalized poly(alloocimene) polymers of the invention will generally have molecular weights in the range of from about 500 to 100,000 and will comprise a mixture of polymer chain structural units. Typically, mixtures of units consist of a majority of units from 2,3-poly(alloocimene) represented by structure (I) and from 6,7-poly(alloocimene) represented by structure (II) and a minority from 4,7-poly(alloocimene) represented by structure (III) given above. The group typically appears on the ends of the functionalized poly(alloocimene) chain and their structure will depend, of course, upon the electrophilic reagent employed in the functionalization.

In general, the functionalized polymers of the invention may be assigned a general structural formula:

$$(X_{\overline{m}})P(-X)_n \tag{IV}$$

wherein P represents the residue of the carbanion salt of 2,3-6,7 poly(alloocimene) as described above; m and n are each positive whole number integers of 0 to 1, provided that at least one of m and n is 1; and X represents the residue of an electrophilic reagent following the functionalization reaction.

More specifically, when the electrophilic reagent is one of the following, X will be the corresponding functional group indicated below:

| ELECTROPHILIC REAGENT | X MOIETY IS |
|---|---|
| CO$_2$ | Carboxyl |
| S | Sulfide |
| SO$_2$ | Sulfinic Acid |
| SO$_3$ | Sulfonic Acid |
| O$_2$ | Hydroperoxy |

When the electrophilic reagent is a group (IVa) metal halide, X will represent the corresponding lower halide, i.e.; for example when silicon tetrachloride is the reagent, the X will be silicon trichloride; when germanium tetrachloride is the reagent, X will be germanium trichloride. The term "halide" as used herein is embracive of chlorine, bromine, iodine and fluorine.

When the electrophilic reagent employed is a carbonyl compound such as aldehyde or a dialdehyde, the product polymer will be of the formula (IV) given above, wherein P, m and n are as described above and X will represent the monovalent moiety of formula:

$$\begin{array}{c} \text{OH} \\ | \\ -\text{C}-\text{R} \\ | \\ \text{H} \end{array} \tag{V}$$

wherein R represents hydrogen or hydrocarbyl (in the case where an aldehyde is used) or hydrocarbyl substituted with a monovalent group of formula:

$$\begin{array}{c} \text{OH} \\ | \\ -\text{CH}_2 \end{array} \tag{VI}$$

(in the case where a dialdehyde is used).

When the electrophilic reagent is a carbonyl compound such as a ketone or a diketone, the product polymer will be of the general formula (IV) given above wherein P, m and n are as defined above and X represents the monovalent moiety of formula:

$$-\underset{R_1}{\underset{|}{C}}-R_2 \quad \text{(VII)}$$
$$\phantom{-C-}OH$$

wherein $R_1$ represents hydrocarbyl and $R_2$ is selected from the group consisting of hydrocarbyl (in the case where the electrophilic reagent is a ketone) and hydrocarbyl substituted with a group of the formula:

$$-\underset{}{\overset{O}{\overset{\|}{C}}}-R_1 \quad \text{(VIII)}$$

wherein $R_1$ is as defined above (when the electrophilic reagent is a diketone); and P, m and n are as previously defined.

The polymers of the invention prepared by functionalization with a mono- or diester will be represented by polymers of the formula (IV) given above, wherein P, m and n are as previously defined and X represents the monovalent moiety of formula:

$$-\underset{R_3}{\underset{|}{C}}-R_1 \quad \text{(IX)}$$
$$\phantom{-C-}OH$$

wherein $R_1$ is as previously defined and $R_3$ is hydrocarbyl (when the electrophilic reagent is a monoester) or hydrocarboxy (when the electrophilic reagent is a diester).

The term "hydrocarbyl" as used herein means the monovalent moiety obtained upon removal of a hydrogen atom from a parent hydrocarbon. For example an acyclic, alicyclic or aromatic hydrocarbon. Representative of hydrocarbyl are alkyl of 1 to 25 carbon atoms, inclusive, such as methyl, ethyl, propyl, butyl, pentyl, hexyl, heptyl, octyl, nonyl, undecyl, decyl, dodecyl, octadecyl, nonodecyl, eicosyl, heneicosyl, docosyl, tricosyl, tetracosyl, pentacosyl and the isomeric forms thereof; aryl of 6 to 25 carbon atoms, inclusive, such as phenyl, tolyl, xylyl, naphthyl, biphenyl, tetraphenyl and the like; aralkyl or 7 to 25 carbon atoms, inclusive, such as benzyl, phenethyl, phenpropyl, phenbutyl, phenhexyl, napthoctyl and the like; cycloalkyl of 3 to 8 carbon atoms, inclusive, such as cyclopropyl, cyclobutyl, cyclopentyl, cyclohexyl, cycloheptyl, cyclooctyl and the like; alkenyl of 2 to 25 carbon atoms, inclusive, such as vinyl, allyl, butenyl, pentenyl, hexenyl, octenyl, nonenyl, decenyl, undececyl, dodecenyl, tridecenyl, pentadecenyl, octadecenyl, and isomeric forms thereof.

The term "alkylene" means the divalent moiety obtained on removal of two hydrogen atoms, each from a non-adjacent carbon atom of a parent hydrocarbon and includes alkylene of 3 to 10 carbon atoms, inclusive, such as 1,3-propylene, 1,4-butylene, 1,5-pentylene, 1,8-octylene, 1,10-decylene and the like.

The term "hydrocarboxy" as used herein means the monovalent moiety of formula:

—O—hydrocarbyl and alkoxy is hydrocarboxy wherein the hydrocarbyl is alkyl.

When the electrophilic reagent is an alkylene oxide, the polymers of the invention will be represented by the formula (IV) given above wherein P, m and n are as previously described and X is the monovalent moiety of formula:

$$-\underset{H}{\underset{|}{C}}-\underset{H}{\underset{|}{\overset{OH}{\overset{|}{C}}}}-R_4 \quad \text{(X)}$$

wherein $R_4$ is selected from the group consisting of hydrogen and hydrocarbyl.

When the electrophilic reagent employed is a nitrile or a dinitrile, for example, if the nitrile is one of the formula:

$$N \equiv C - R_5 \quad \text{(XI)}$$

wherein $R_5$ represents hydrocarbyl or a monovalent moiety of formula:

$$-R_6 - C \equiv N \quad \text{(XII)}$$

wherein $R_6$ represent alkylene, then the polymers of the invention are represented by the formula (IV) given above wherein P, m and n are as defined above and X represents the monovalent moiety of formula:

$$-\overset{N^{\ominus}}{\overset{\|}{C}}-R_5 \quad \text{(XIII)}$$

wherein $R_5$ is as defined above. The moiety of formula (XIII) will convert to the ketonic group of formula:

$$-\overset{O}{\overset{\|}{C}}-R_5 \quad \text{(XIV)}$$

wherein $R_5$ is as defined above upon saponification, under conventional saponification conditions.

The following examples describe the manner and the process of making and using the invention and set forth the best mode contemplated by the inventor for carrying out the invention.

EXAMPLE 1

To a clean, oven-dried, four-neck round-bottom flask, equipped with a thermometer, nitrogen inlet, pressure equalizing addition funnel, a reflux condensor into which was inserted an inert gas exit adapter, and a Nicrome wire stirrer, was added sodium shot (1.17 g) and toluene (100 ml) which had been dried and distilled from calcium hydride. A nitrogen blanket was maintained in the reaction flask at all times. Heat was applied and stirring initiated. The toluene was allowed to gently reflux for 25 minutes, and then it was cooled. At this point tetrahydrofuran (100 ml) was added. Alloocimene (75 ml, 44.2% pure), which had been dried over calcium hydride and distilled, was charged to the addition funnel. The polymerization temperature of 20° C. was maintained by cooling the reaction flask with a dry-ice isopropanol bath intermittently. The cooling was controlled by a temperature sensing device, which applied the bath when the temperature exceeded 20° C. Polymerization was initiated by slowly adding the alloocimene mixture over one hour to the stirred solvent containing sodium metal.

After about 4.5 hours, the polymerization mixture was transferred to a 500 ml three-neck round-bottom flask containing a −20° C. THF solution of $CO_2$ by a double-ended needle. The temperature was maintained at −20° C. by applying a dry-ice isopropanol bath. The functionalized poly(alloocimene) was isolated by transferring the polymer solution into a separatory funnel containing excess methanol. After deactivation of the catalyst, the organic layer was washed three times with 10% sodium bicarbonate. The organic solution was then dried over anhydrous magnesium sulfate and filtered into a round-bottom flask. The solvent(s) was removed at reduced pressures. Any monoterpenes were isolated at approximately 63° C. (5 mm Hg). The distillation was terminated when the temperature in the pot containing the polymer product reached about 150° C. The polymer was poured while hot into a pan, allowed to cool, then stored under nitrogen. The polymer yield was 25.6 g, about 93% of theory. It had a glass transition temperature of 4° C. and a weight average molecular weight of 1518 as determined by GPC with polystyrene calibration standards. This material is characterized in the table below.

.The aqueous bicarbonate was acidified with dilute sulfuric acid to a pH of about 3, and the acidified solution was extracted three times with about 100 ml of ether in each extraction. The ether portions were combined and dried over anhydrous magnesium sulfate. The ether was distilled at reduced pressures. The residue weighed 4.6 g, and liquid chromatographic analysis indicated that this material was composed of mostly low molecular weight compounds.

EXAMPLE 2

Functionalized poly(alloocimene) was prepared by the procedure reported in Example 1, supra, except 60 ml of alloocimene of 95% purity, 1.19 g of sodium, 100 ml of dry 1,2-dimethoxyethane, and 75 ml of toluene were employed. The reaction temperature was controlled to −20° C. The yield was 43.6 g or approximately 85.6% of theoretical. The properties measured on this material are reported in the table below. An infra-red spectra for the product is shown in the accompanying drawing. The carboxylated polymer is useful, for example, to form unsaturated polyester coatings upon reaction with a diol such as 1,6-hexamethylene diol or ethylene glycol.

TABLE

| Properties of Functionalized Poly(alloocimene) | Example 1 | Example 2 |
|---|---|---|
| Acid Number | 25 | 17 |
| Weight average molecular weight | 2400 | 9600 |
| Glass transition temperature (°C.) | 4 | 57 |

What is claimed is:

1. The functionalized polymer prepared from the reaction of an electrophilic reagent and anionically active poly(alloocimene) comprised of a mixture of greater than 50 weight percent 2,3- and 6,7-poly(alloocimene) and less than 50 weight percent 4,7-poly(alloocimene) residues in the polymer chain thereof.

2. The functionalized polymer of claim 1 wherein the electrophilic reagent is carbon dioxide.

3. The functionalized polymer of claim 1 wherein the electrophilic reagent is formaldehyde.

4. The functionalized polymer of claim 1 wherein the electrophilic reagent is alkylene oxide.

5. The functionalized polymer of claim 1 wherein the electrophilic reagent is selected from the group consisting of an acyclic, alicyclic, or aryl monoester or diester.

6. The functionalized polymer of claim 1 wherein the electrophilic reagent is selected from the group consisting of an acyclic, alicyclic, or aryl monoaldehyde or dialdehyde.

7. The functionalized polymer of claim 1 wherein the electrophilic reagent is selected from the group consisting of acyclic, alicyclic, and aryl ketone or diketone.

8. The functionalized polymer of claim 1 wherein the electrophilic reagent is selected from the group consisting of acyclic, alicyclic, and aryl nitrile or dinitrile.

9. The functionalized polymer of claim 1 wherein the electrophilic reagent is oxygen.

10. The functionalized polymer of claim 1 wherein the electrophilic reagent is sulfur.

11. The functionalized polymer of claim 1 wherein the electrophilic reagent is sulfur dioxide.

12. The functionalized polymer of claim 1 wherein the electrophilic reagent is sulfur trioxide.

13. The functionalized polymer of claim 1 wherein the electrophilic reagent is a Group IVa metal halide selected from the group consisting of silicon, germanium, tin, or lead.

14. The functionalized polymer of claim 1 wherein the electrophilic reagent is ethylene oxide.

* * * * *